United States Patent
Kanazawa et al.

(10) Patent No.: US 12,481,921 B2
(45) Date of Patent: Nov. 25, 2025

(54) UNCERTAINTY-AWARE CONTINUOUS CONTROL SYSTEM BASED ON REINFORCEMENT LEARNING

(71) Applicant: Hitachi, Ltd., Tokyo (JP)

(72) Inventors: Takuya Kanazawa, Santa Clara, CA (US); Haiyan Wang, Fremont, CA (US); Chetan Gupta, San Mateo, CA (US)

(73) Assignee: HITACHI, LTD., Tokyo (JP)

( * ) Notice: Subject to any disclaimer, the term of this patent is extended or adjusted under 35 U.S.C. 154(b) by 756 days.

(21) Appl. No.: 17/862,147

(22) Filed: Jul. 11, 2022

(65) Prior Publication Data

US 2024/0013090 A1    Jan. 11, 2024

(51) Int. Cl.
  *G06F 16/00*    (2019.01)
  *G06N 20/00*    (2019.01)
(52) U.S. Cl.
  CPC .................................... *G06N 20/00* (2019.01)
(58) Field of Classification Search
  None
  See application file for complete search history.

(56) References Cited

U.S. PATENT DOCUMENTS

| | | | |
|---|---|---|---|
| 12,038,477 B1 * | 7/2024 | Saba | G06N 20/00 |
| 12,141,512 B1 * | 11/2024 | Saba | G06F 30/333 |
| 12,141,677 B2 * | 11/2024 | Silver | G06N 3/047 |
| 2019/0310649 A1 | 10/2019 | Halder | |
| 2019/0332923 A1 | 10/2019 | Gendron-Bellemare et al. | |
| 2020/0151562 A1 * | 5/2020 | Pietquin | G06N 3/092 |
| 2020/0293862 A1 * | 9/2020 | Wang | G06N 3/047 |
| 2020/0293883 A1 * | 9/2020 | Budden | G06N 3/045 |
| 2020/0326667 A1 * | 10/2020 | Ahuja | G06N 3/047 |
| 2020/0364557 A1 * | 11/2020 | Ostrovski | G06N 3/04 |
| 2021/0073912 A1 | 3/2021 | Da Silva et al. | |
| 2021/0081787 A1 * | 3/2021 | Qi | G06N 3/047 |
| 2021/0117760 A1 * | 4/2021 | Krishnan | G06N 3/08 |
| 2021/0232922 A1 * | 7/2021 | Zhang | G06F 18/214 |
| 2021/0264795 A1 * | 8/2021 | Mguni | G06N 3/006 |

(Continued)

OTHER PUBLICATIONS

N. A. Urp'i, S. Curi, and A. Krause, "Risk-averse offline reinforcement learning," in 9th International Conference on Learning Representations, ICLR 2021, Virtual Event, Austria, May 3-7, 2021. (Year: 2021).*

(Continued)

*Primary Examiner* — Polina G Peach
(74) *Attorney, Agent, or Firm* — Procopio, Cory, Hargreaves & Savitch LLP

(57) ABSTRACT

A method for reinforcement learning (RL) of continuous actions. The method may include receiving a state as input to at least one actor network to predict candidate actions based on the state, wherein the state is a current observation; outputting the candidate actions from the at least one actor network; receiving the state and the candidate actions as inputs to a plurality of distributional critic networks, wherein the plurality of distributional critic networks calculates quantiles of a return distribution associated with the candidate actions in relation to the state; outputting the quantiles from the plurality of distributional critic networks; and selecting an output action based on the candidate actions and the quantiles.

14 Claims, 12 Drawing Sheets

(56) References Cited

U.S. PATENT DOCUMENTS

| | | | |
|---|---|---|---|
| 2022/0036186 A1* | 2/2022 | Refaat | G06N 3/088 |
| 2022/0044110 A1* | 2/2022 | Ryu | G06N 3/08 |
| 2022/0114464 A1* | 4/2022 | Yang | G06N 20/20 |
| 2023/0041035 A1* | 2/2023 | Harsha | G06N 3/006 |
| 2023/0050627 A1* | 2/2023 | Sattarov | G06F 30/27 |
| 2023/0066952 A1* | 3/2023 | Huang | A61F 2/68 |
| 2023/0142461 A1* | 5/2023 | Hoel | G06N 3/006 |
| | | | 701/23 |
| 2023/0316088 A1* | 10/2023 | Huang | G06N 3/044 |
| | | | 706/25 |
| 2023/0394339 A1* | 12/2023 | Foster | G06N 3/08 |
| 2023/0422277 A1* | 12/2023 | De Carvalho Evangelista | |
| | | | H04W 72/50 |
| 2024/0088959 A1* | 3/2024 | Lee | G06N 3/08 |
| 2024/0380455 A1* | 11/2024 | Lee | H04B 7/024 |
| 2025/0119193 A1* | 4/2025 | Zhang | H04B 7/024 |

OTHER PUBLICATIONS

R. Singh, Q. Zhang, and Y. Chen, "Improving robustness via risk averse distributional reinforcement learning," in Proceedings of the 2nd Annual Conference on Learning for Dynamics and Control, L4DC 2020, Online Event, Berkeley, CA, USA, Jun. 11-12, 2020. (Year: 2020).*

Cao, Zehong, and Chin-Teng Lin. "Reinforcement learning from hierarchical critics." IEEE Transactions on Neural Networks and Learning Systems 34.2 (2021): 1066-1073. (Year: 2021).*

Eriksson, Hannes, and Christos Dimitrakakis. "Epistemic risk-sensitive reinforcement learning." 2019 arXiv preprint arXiv: 1906.06273. (Year: 2019).*

Siddharth Mysore, George Cheng, Yunqi Zhao, Kate Saenko, Meng Wu "Multi-Critic Actor Learning: Teaching RL Policies to Act with Style" Published: Jan. 28, 2022 (Year: 2022).*

* cited by examiner

| No. | Observation | | | Action | | Reward | Next observation | | |
|---|---|---|---|---|---|---|---|---|---|
| 1 | 2.521 | 0.142 | −1.448 | −1.543 | −0.157 | 0.641 | 1.358 | −0.070 | 0.581 |
| 2 | −0.892 | −1.430 | −0.035 | 0.502 | −0.947 | 1.315 | −0.316 | −0.173 | 0.616 |
| 3 | −0.504 | 0.325 | 0.607 | −0.292 | −1.119 | −1.948 | 0.472 | 0.720 | −0.312 |
| ... | ... | ... | ... | ... | ... | ... | ... | ... | ... |
| 500000 | −0.715 | 0.906 | 1.482 | −0.177 | 1.465 | −0.560 | 1.367 | 2.311 | −0.337 |

FIG. 11

# UNCERTAINTY-AWARE CONTINUOUS CONTROL SYSTEM BASED ON REINFORCEMENT LEARNING

BACKGROUND

Field

The present disclosure is generally directed to a method and a system for reinforcement learning (RL) on continuous actions through use of distributional critics and actor networks.

Related Art

Optimal control theory of machines is one of the most important fields in engineering. It is relevant not only to the control of vehicles and factory equipment but also to the control of macroscopic social/public systems such as energy grids and traffic signal control systems. Mathematical optimization methods such as linear programming and mixed-integer programming are popular, but they are only applicable to a limited class of problems and are generally slow as problems are solved from the start without prior knowledge. Heuristic methods developed by domain experts over the years are much faster and give reasonable results in many cases, but they lack generality and have to be hand-crafted for each problem.

As real-world applications of RL become popular, RL has come to be used in more and more high-stakes areas such as autonomous driving, healthcare, financial trading, energy resource allocation, and armament control. In such areas the reliability of AI is crucial. When AI is not confident about its prediction or output, AI must make it clear to human users so that they can override AI's decision or prepare for unexpected situations that are about to come true. Uncertainty quantification in deep learning is a field that made impressive progress in recent years. The methods developed include Bayesian neural networks, quantile neural networks, neural network ensembles, Monte Carlo Dropout, and so forth.

In the related art, various approaches are utilized in the quantification of uncertainty in RL and deep learning. In a first approach, quantile neural network is employed for value estimation and are capable of evaluating aleatoric uncertainty (AU). The approach relates to an RL method that aims to improve performance by estimating AU through quantile neural networks and is formulated for discrete actions. In a second approach, epistemic uncertainty may be captured by training multiple neural networks in parallel. A third approach provides access to both uncertainties but works only for discrete action spaces.

Current known RL methods are black box, i.e., lack interpretability. Sometimes the Artificial Intelligence (AI) recommends a true optimal action, other times an outlandish or dangerous action may be recommended. However, it is unclear to the human users when the AI's decision should be trusted and when it should not be.

RL is known to be more resource-intensive than supervised learning and unsupervised learning. That is, sample complexity of RL agents is extremely high. At the same time, the computational cost of training an RL agent until convergence in a simulator or in a real environment is sizable. This becomes quite problematic when the simulators are slow.

Standard RL approaches that ignore uncertainty fail to learn a risk-sensitive policy. Suppose a policy, optimal in the sense of an expectation value, achieves a high score with probability 95% but miserably fails with probability 5%. While this could be acceptable in less-risky environments such as computer games and recommender systems, this is unacceptable in cases where failure of the agent implies dangers to humans or damages to social infrastructure. Therefore, it is critical to let AI acquire a behavior policy that not only achieves high performance in expectation but also avoids serious outcomes. Such risk-aware policy learning is not possible with RL algorithms that are blind to uncertainties.

RL for optimal sequential decision making has a long history of research. While RL has long been considered inefficient or inferior compared to the abovementioned optimization methods, in recent years RL has improved dramatically owing to the adoption of deep neural networks. Unlike ordinary supervised learning where dataset with correct labels are provided, an AI agent in RL learns an optimal sequence of actions through rewards that are given by the environment to encourage or penalize agent's actions.

The early success of RL was in the area of games, where the action at each step is selected from a discrete set such as move up, move down, move right, move left, shoot, no action, and etc. Later, RL algorithms for continuous control such as Deep Deterministic Policy Gradient (DDPG), Proximal Policy Optimization (PPO), and Soft Actor-Critic (SAC) were developed and have shown superhuman performance in certain tasks. Note that continuous control tasks appear frequently in real-world setting. For instance, the speed of a self-driving car is continuous, the duration of a traffic signal is continuous, and the amount of power generation by generators in power grids is also continuous. Hence it is of vital importance to improve RL methods for continuous control problems.

SUMMARY

Aspects of the present disclosure involve an innovative method for reinforcement learning (RL) of continuous actions. The method may include receiving a state as input to at least one actor network to predict candidate actions based on the state, wherein the state is a current observation; outputting the candidate actions from the at least one actor network; receiving the state and the candidate actions as inputs to a plurality of distributional critic networks, wherein the plurality of distributional critic networks calculates quantiles of a return distribution associated with the candidate actions in relation to the state; outputting the quantiles from the plurality of distributional critic networks; and selecting an output action based on the candidate actions and the quantiles.

Aspects of the present disclosure involve an innovative non-transitory computer readable medium, storing instructions for reinforcement learning (RL) of continuous actions. The instructions may include receiving a state as input to at least one actor network to predict candidate actions based on the state, wherein the state is a current observation; outputting the candidate actions from the at least one actor network; receiving the state and the candidate actions as inputs to a plurality of distributional critic networks, wherein the plurality of distributional critic networks calculates quantiles of a return distribution associated with the candidate actions in relation to the state; outputting the quantiles from the plurality of distributional critic networks; and selecting an output action based on the candidate actions and the quantiles.

Aspects of the present disclosure involve an innovative server system for reinforcement learning (RL) of continuous actions. The server system may include receiving a state as input to at least one actor network to predict candidate actions based on the state, wherein the state is a current observation; outputting the candidate actions from the at least one actor network; receiving the state and the candidate actions as inputs to a plurality of distributional critic networks, wherein the plurality of distributional critic networks calculates quantiles of a return distribution associated with the candidate actions in relation to the state; outputting the quantiles from the plurality of distributional critic networks; and selecting an output action based on the candidate actions and the quantiles.

Aspects of the present disclosure involve an innovative system for reinforcement learning (RL) of continuous actions. The system can include means for receiving a state as input to at least one actor network to predict candidate actions based on the state, wherein the state is a current observation; means for outputting the candidate actions from the at least one actor network; means for receiving the state and the candidate actions as inputs to a plurality of distributional critic networks, wherein the plurality of distributional critic networks calculates quantiles of a return distribution associated with the candidate actions in relation to the state; outputting the quantiles from the plurality of distributional critic networks; and means for selecting an output action based on the candidate actions and the quantiles.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 11 illustrates example experience tuples, in accordance with an example implementation.

DETAILED DESCRIPTION

Figure 1:
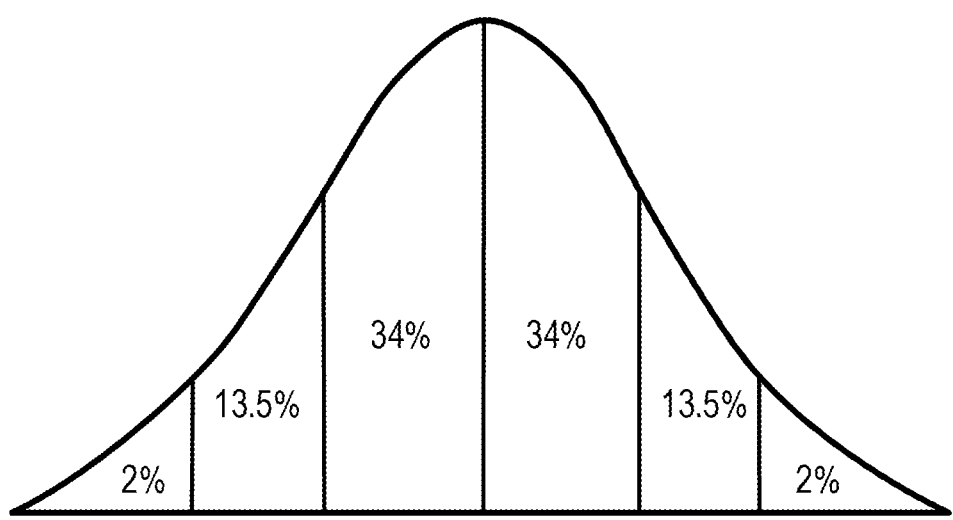
FIG. 1 illustrates an example quantile points of probability distribution.

The following detailed description following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In RL, it is critical to evaluate two type of uncertainties, specifically, aleatoric uncertainty (AU) and epistemic uncertainty (EU). AU refers to uncertainty that arises from the inherent stochasticity of the environment. Taking drone control for example, wind speed and directions are random, and an RL agent cannot perfectly control a drone no matter how long it is trained in a virtual simulating environment. On the other hand, EU refers to uncertainty due to lack of knowledge. For example, an RL agent trained to drive a car based on visual inputs from car's cameras may completely fail in a snowy day if it has never experienced such a situation in simulations before. In short, AU is objective uncertainty, while EU is subjective uncertainty. An RL agent can reduce EU of the environment by experiencing diverse situations and taking diverse actions to enrich its knowledge of the environment. In contrast, an RL agent can never reduce AU through extended training because the environmental randomness is objective and cannot be removed.

A novel RL method for addressing the continuous control problems is Uncertainty-Aware Deep Deterministic Policy Gradient (UA-DDPG). It integrates ensemble critic learning, distributional critic learning, and actor-critic architecture with multiple actor networks, to capture both AU and EU. The reliable uncertainty estimation in UA-DDPG improves interpretability, accelerates training in simulators, and allows for efficient learning of a conservative (viz. risk-sensitive) policy. Applications of the UA-DDPG include but not limited to, optimal control of robots, vehicles, factory equipment, and large-scale systems such as power grids and traffic signal management systems.

Suppose multiple machine-learning models are trained on a dataset. After training of the models has completed, predictions of all models should agree for a test sample that is similar to any one of the training samples. However, models may well give different predictions for a test sample that is outside the range of the training dataset, since different models in general perform extrapolations in different manners. As such, it is widely accepted to train multiple neural networks simultaneously and employ the variance of their predictions as a metric of EU. This approach can equally apply to RL as well. This is achieved by training multiple critic networks with independent random initializations of network parameters (such as biases and weights) in parallel through interactions with environment. There is no direct interaction between different critical networks.

Ensembles of critical networks can capture EU, but these are not so effective for AU estimation. For this reason, distributional critical networks may be employed to effective estimate the AU. A distributional critical network or distributional neural network is a network that makes not only a point prediction but a prediction of distribution. For example, suppose it is desired to predict the amount of precipitation for tomorrow. Generation of a specific value is providing a point prediction. On the other hand, provision of probability distribution of precipitation (e.g., 10% probability of zero rainfall, 6% of extreme rainfall, 29% of light rainfall, and etc.) is a distributional prediction. In contrast, a distributional prediction carries much more information than a point prediction. Since a distribution is parametrized by quantiles, distributional neural networks are also called quantile neural networks. Their last layer has multiple neurons each of which predicts quantiles of the Q-value distribution. FIG. 1 illustrates an example quantile points of probability distribution.

Figure 2:
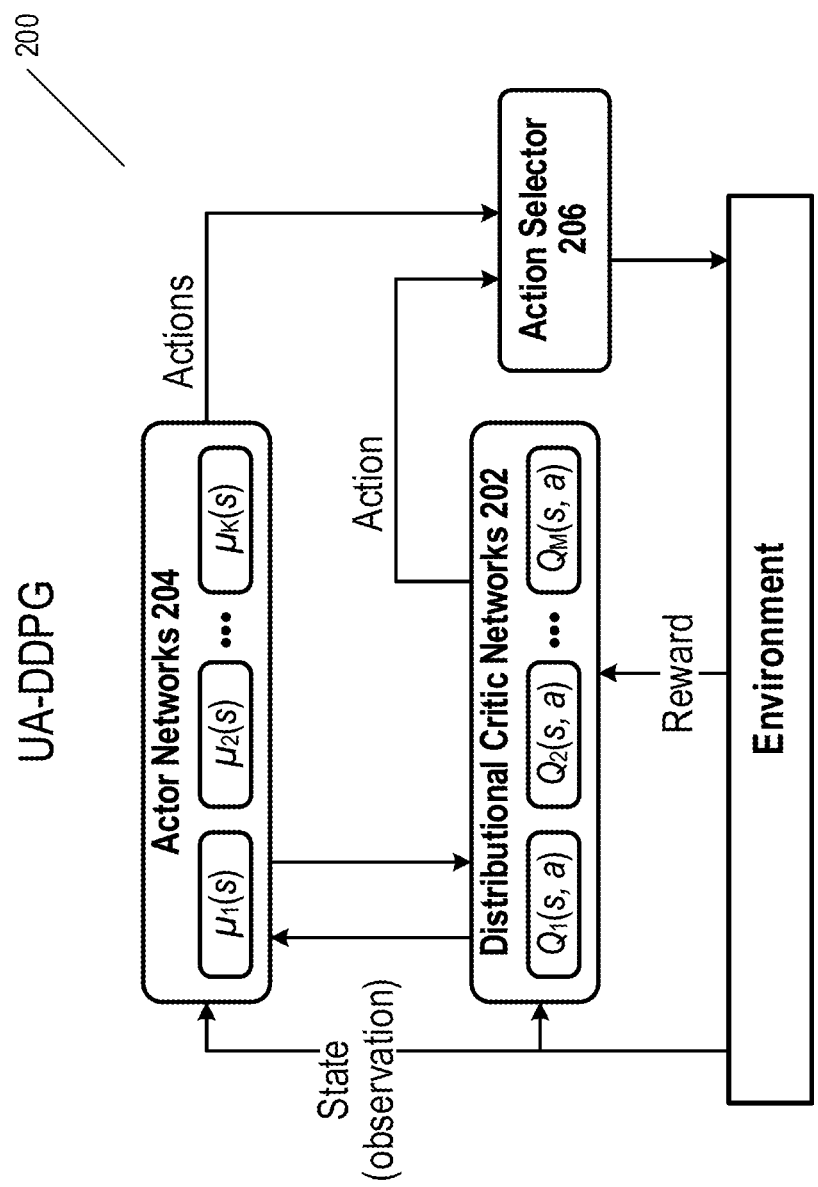
FIG. 2 illustrates an example UA-DDPG structure, in accordance with an example implementation.

FIG. 2 illustrates an example UA-DDPG structure 200, in accordance with an example implementation. As illustrated in FIG. 2, the UA-DDPG structure 200 comprises distributional critic networks 202, actor networks 204, an action selector 206. Here, s represents a state/current observation, and a represents the recommended action. The actor networks 204 receive current observation/state s as input and generate recommended actions a as outputs to the action selector 206. The distributional critic networks 202 receive current observation/state s and recommended actions from actor networks 204 as inputs and generate critic values associated with the recommended actions a. While the UA-DDPG in capable of operating with a single actor network, the use of multiple actor networks allows for efficient and faster learning. Use of independently trained multiple actor networks 204 will help to escape from local optima and arrive at a global optimum, in a way similar to optimum search by an ensemble of agents in evolutionary computation. Rewards are given by the environment to encourage or penalize UA-DDPG structure 200's actions.

Figure 3:
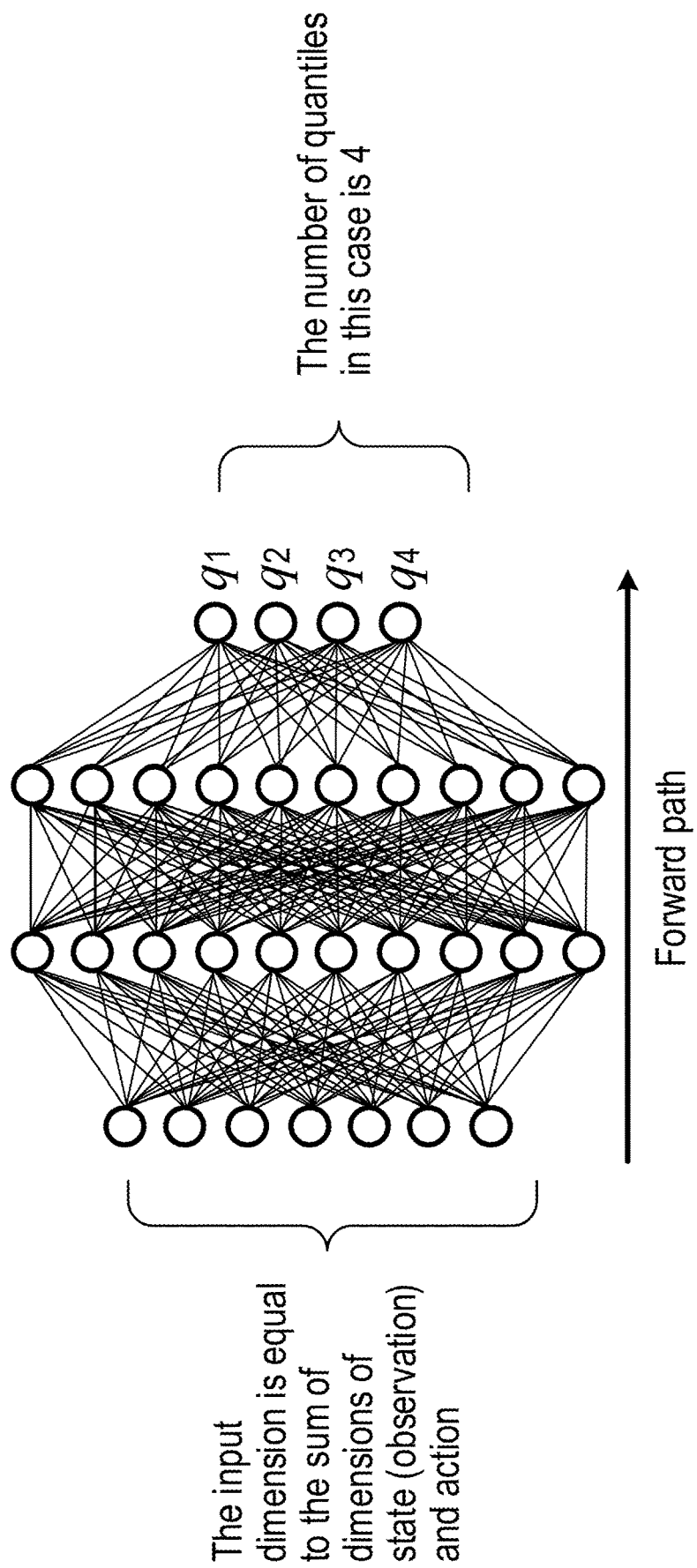
FIG. 3 illustrates an example distributional critic network with quantiles of four, in accordance with an example implementation.

FIG. 3 illustrates an example distributional critic network with quantiles of 4, in accordance with an example implementation. As illustrated in FIG. 3, a typical distributional critic network Q(s, a) has two hidden layers for quantile generation from inputs. In some example implementations, complex architecture such as convolutional neural network (CNN) is applied to the distributional critic networks. The input dimension is equal to the sum of dimensions of the current observation/state s and a recommended action a. The example provided outputs quantiles of the number four.

Figure 4:
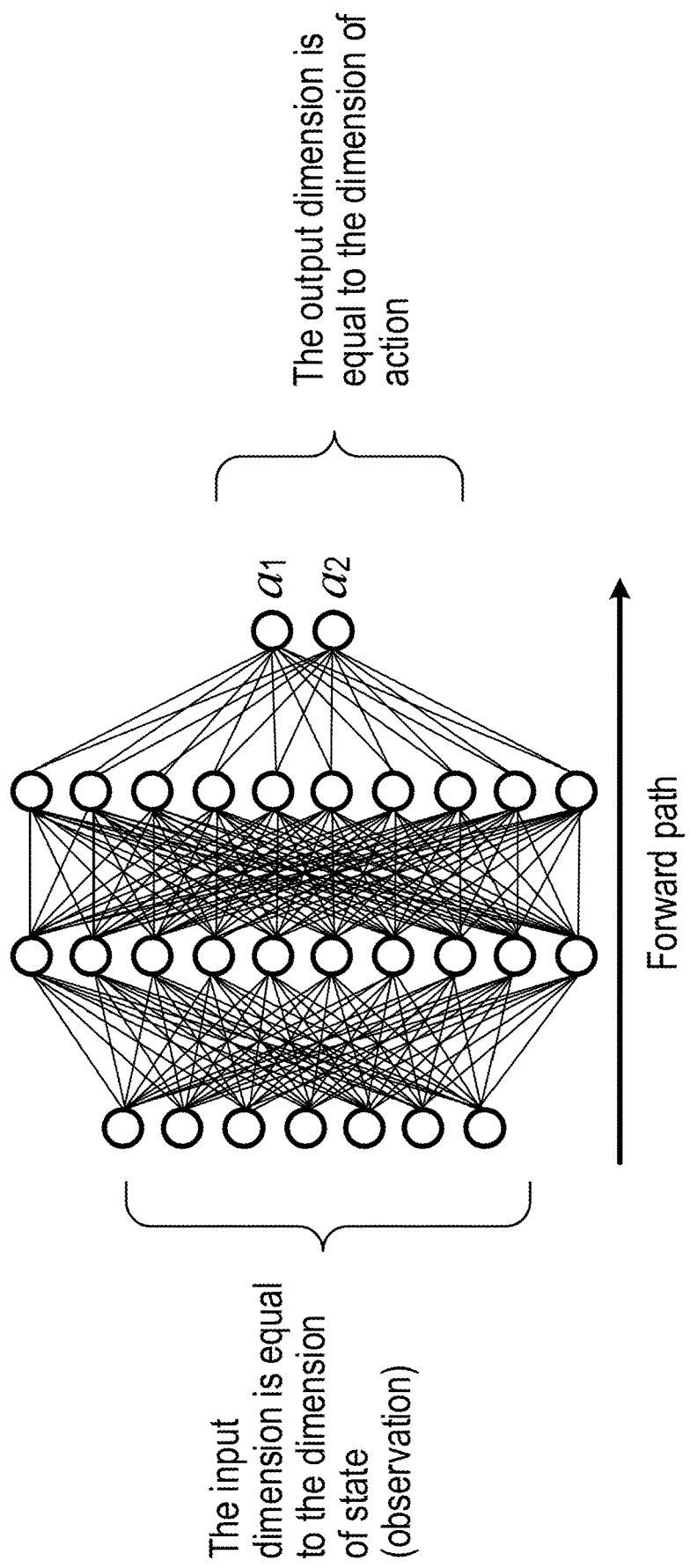
FIG. 4 illustrates an example distributional critic network with an action dimension of 2, in accordance with an example implementation.

FIG. 4 illustrates an example distributional critic network with an action dimension of 2, in accordance with an example implementation. As illustrated in FIG. 4, a typical actor network µ(s) has two hidden layers for quantile generation from inputs. In some example implementations, complicated architecture such as CNN is applied to the distributional critic network. The input dimension is equal to the dimension of the current observation/state s. The output dimension is equal to the dimension of recommended actions α.

The action selector 206 selects a single action from the recommended actions a generated from the actor networks 204. Action selection may be based on selection of an action that has attained a highest risk-aware average (RAA) of critic values from the recommended actions. The RAA, also known as conditional value at risk, measures and quantifies the risk associated with an action. The RAA may be generated at the distributional critic networks 202 and received at the action selector 206. In some example implementations, the RAA is calculated and generated at the action selector 206. RAA can be calculated from $$CVaR_b(X) = \frac{1}{b}\int_0^b VaR_\gamma(X)d\gamma$$

where $$VaR_b(X) = \min\{z \in \mathbb{R} \mid P(X \leq z) \geq b\}$$

is the value at risk, with b=0.01 or 0.05.

For example, if the number of quantiles is 30, the output of each critic network is $\{q_1, q_2, \ldots, q_{30}\}$ where $q_1 < q_2 < \ldots < q_{30}$. In the case of b=0.2, the associated CVaR is given by $\frac{1}{6}(q_1+q_2+q_3+q_4+q_5+q_6)$. The computed CVaR is to be compared with the standard average of $\frac{1}{30}\Sigma_{n=1}^{30} q_n$. Each actor network is trained to maximize such risk-sensitive averages. UA-DDPG works with arbitrary distorted average of quantiles and is not limited only to CVaR. However, CVaR is computationally easy to handle and hence a recommended choice.

The value of 0<b<1, i.e., the degree of conservativeness, is a hyperparameter of the algorithm and must be tuned separately for each task. In general, an agent needs to be trained numerous times with various settings of hyperparameters to attain desirable performance.

For example, suppose that possible critic values for action 1 are {−10, 10, 20, 30} with equal probability for each value, whereas the possible critic values for action 2 are {1,2,3,4,5} with equal probability for each value. Assuming action 1 and 2 are the two options from among the recommend actions that have the highest average critic values. Action 1 has a significantly higher average critic value or RAA (=12.5) than that of action 2 (=3), thus action 1 is the best choice among the recommended actions.

In some example implementations, action selection may be based on both comparison of RAA values from the recommended actions and assessment of individual critic values. An example combination involves picking out an action that attains the best "worst outcome". For example, suppose that possible critic values for action 1 are {−10, 10, 20, 30} with equal probability for each value, whereas the possible critic values for action 2 are {1,2,3,4,5} with equal probability for each value. Assuming action 1 and 2 are the two options from among the recommend actions that have the highest average critic values. Action 1 has a significantly higher average critic value (=12.5) than that of action 2 (=3), so it appears that action 1 is the best choice among the options. However, in the aforementioned criterion, we should look at the "worst possible outcome". The worst critic value (=−10) for action 1 is lower than that (=1) of action 2. Hence action 2 is becomes the best choice among the possible options. In some example implementations, other risk-aware policies are utilized in the selection determination.

Figure 5:
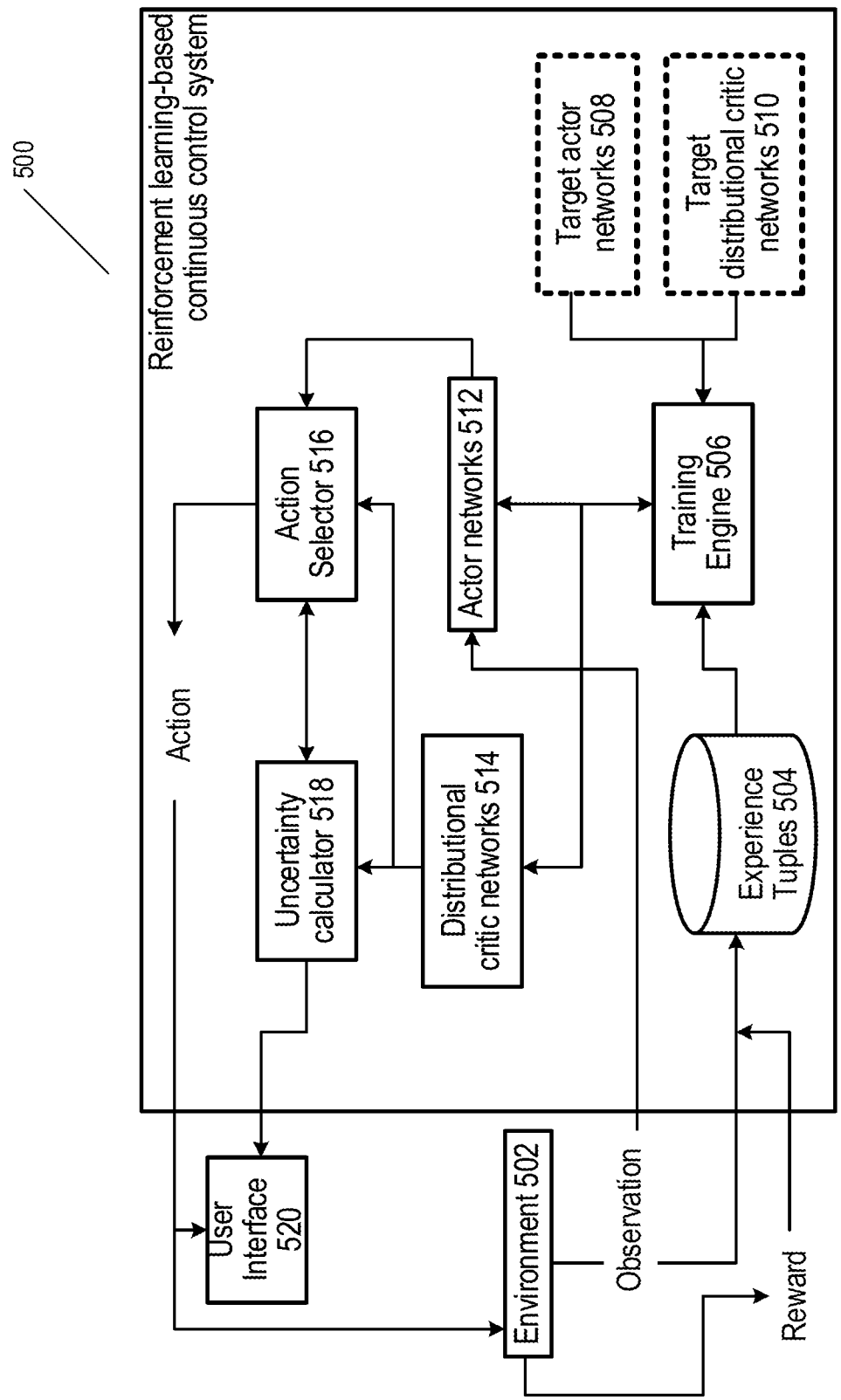
FIG. 5 illustrates an example UA-DDPG system, in accordance with an example implementation.

FIG. 5 illustrates an example UA-DDPG system 500, in accordance with an example implementation. The UA-DDPG system 500 may include environment 502, experience tuples 504, training engine 506, target actor networks 508, target distributional critic networks 510, actor networks 512, distributional critic networks 514, action selector 516, uncertainty calculator 518, and user interface 520. Environment 502 provides current observation/state to the experience tuples 504 and actor networks 512, and reward along with the current observation/state to the experience tuples 504.

At the training engine 506, training actor networks and training distributional critic networks are retrieved from target actor networks 508 and target distributional critic networks 510. A mini-batch or sample tuple is retrieved from the experience tuples 504 as sample training input to the training engine 506 to help adjust and fine tune the training actor networks and training distributional critic networks. On completion of training, the trained actor networks and distributional critic networks are stored at actor networks 512 and distributional critic networks 514.

The actor networks 512 generates recommended actions based on received current observation/state and provides them to the distributional critic networks 514 and action selector 516 for further processing and selection. The distributional critic networks 514 generates calculated quantile outputs based on recommended actions and current observation/state to the action selector 516. Outputs generated from the distributional critic networks 514 are sent to the uncertainty calculator 518 to estimate uncertainties associated with the outputs.

The action selector 516 generates a next action by assessing calculated uncertainties from the uncertainty calculator 518, quantile associated calculations from the distributional critic networks 514, and recommended actions from the actor networks 512. The next action and the calculated uncertainties are then displayed on the user interface 520 where a user will make the decision to proceed with the next action or maintain the course of action. The selected action/decision will then be applied in environment 502.

Figure 6:
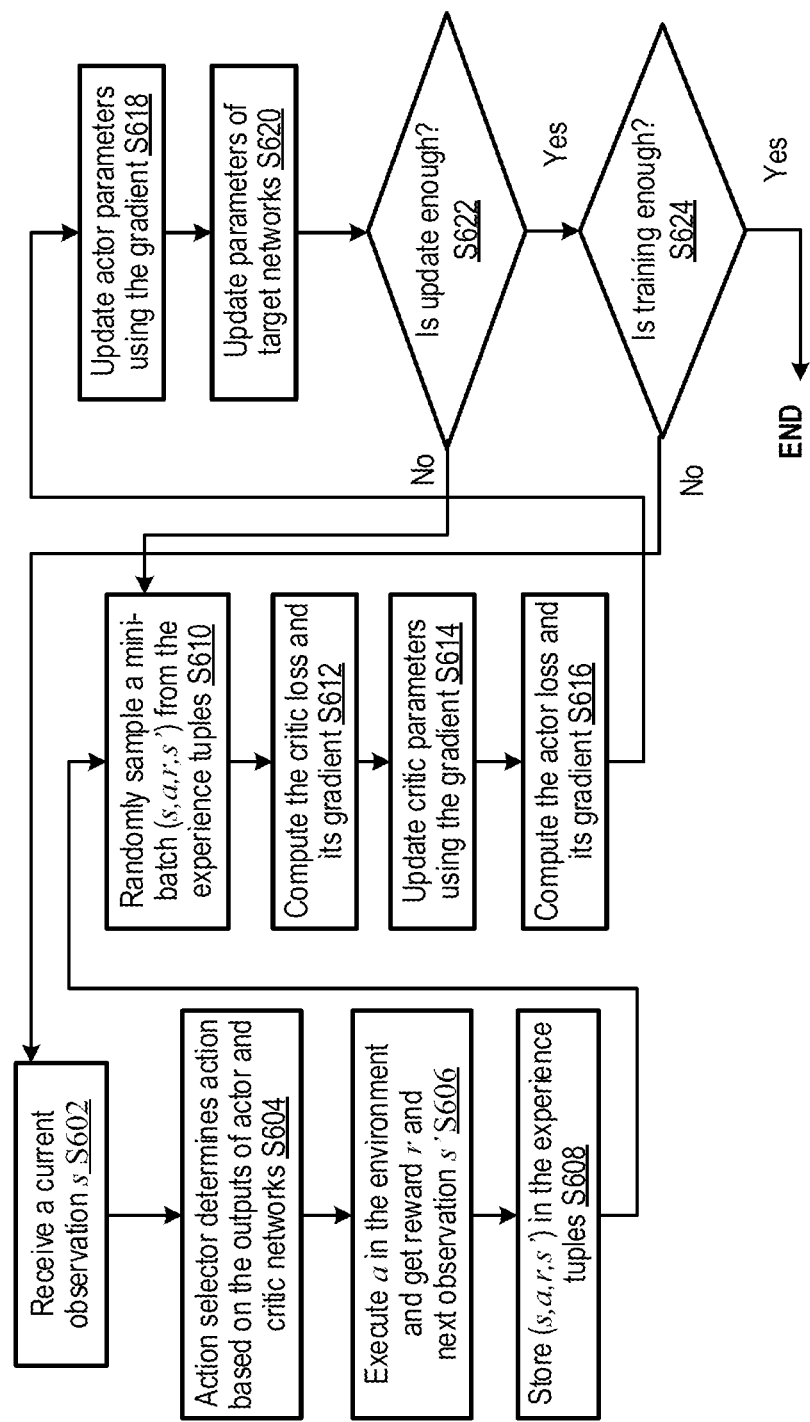
FIG. 6 illustrates an example process for training UA-DDPG, in accordance with an example implementation.

FIG. 6 illustrates an example process for training UA-DDPG, in accordance with an example implementation. At S602, a current observation s is received. At S604, action selector determines action based on the outputs of the actor networks and distributional critic networks. At S606, action a is executed in the environment, and reward r and next observation s' are received. At S608, storing the set/mini-batch of (s,a,r,s') in the experience tuples. At S610, a mini-batch (s,a,r,s') is randomly sampled from the experience tuples.

At S612, critic loss and its gradient are computed. Distributional critic networks and actor networks are trained simultaneously, affecting one another, until convergence. The training proceeds by updating network parameters through stochastic gradient descent methods such as Adam in order to minimize loss functions. The distributional critic networks are trained to minimize the distributional critic loss. Loss for the n-th distributional critic network $Q(\phi_n)$ ($n \in \{1,2,\ldots,M\}$) whose outputs are $\{q_i\}_{i=1}^{N_{qt}}$ is represented by $$L(\phi_n) = \left(\frac{1}{N_{qt}}\right)^2 \sum_{i,j=1}^{N_{qt}} \frac{1}{|B|} \sum_{(s,a,r,s') \in B} \rho_{\hat{\tau}_i}^\kappa (\mathcal{T} q_j(s') - q_i(\phi_n; s, a))$$

whereas the distributional critic is updated through $$\phi_n \leftarrow \phi_n - \delta \cdot \nabla_{\phi_n} L(\phi_n)$$

-continued $$\mathcal{T} q_j(s') = r + \gamma \cdot \frac{1}{M} \sum_{m=1}^{M} q_j(\widehat{\phi_m}; s', \mu(\widehat{\theta_{\bar{k}}}; s'))$$

$$\bar{k} = \underset{k}{\mathrm{argmax}} \left\{ RAA\left( \left\{ \frac{1}{M} \sum_{m=1}^{M} q_j(\widehat{\phi_m}; s', \mu(\widehat{\theta_k}; s')) \right\}_{j=1}^{N_{qt}} \right) \middle| k=1,\ldots,K \right\}$$

where $N_{qt}$ is the number of quantiles. $\gamma \in (0,1)$ is the discount factor. $\{\phi_n\}$ denotes the parameters of the trained critic networks. $\{\widehat{\phi_m}, \widehat{\theta_k}\}$ denote the parameters of the target networks of distributional critic and actor, respectively.

B is a mini-batch of samples taken randomly from the replay buffer and |B| is the mini-batch size. (s, a, r, s') represents a tuple of current observation/state, action, reward and next state. Whereas $$\hat{\tau}_i = \frac{2i-1}{2N_{qt}} (1 \le i \le N_{qt})$$

are quantile points.

RAA in the equation for $\bar{k}$ represents the risk-aware average of quantiles. $\rho$ is an asymmetric Huber loss and is represented by $$\rho_\tau^\kappa(u) = |\tau - \delta_{\{u<0\}}| \mathcal{L}_\kappa(u)$$

$$\mathcal{L}_\kappa(u) = \begin{cases} \frac{1}{2} u^2, & \text{if } |u| \le \kappa \\ \kappa\left(|u| - \frac{1}{2}\kappa\right), & \text{otherwise} \end{cases}.$$

where $\delta_{\{u<0\}}$ is 1 if u<0, otherwise it is 0. $\kappa \ge 0$ is a free parameter and $\kappa=1$ is a common choice for the free parameter. The loss function comprises a sum over all quantiles, indicating that critic networks are trained to learn all quantile values of future cumulative rewards. The index ($\bar{k}$) of the best actor is determined through maximization of the RAA of critics' outputs.

At S614, the distributional critic parameters are updated using the gradient. Specifically, the distributional critic is updated through $$\phi_n \leftarrow \phi_n - \delta \cdot \nabla_{\phi_n} L(\phi_n)$$

At S616, actor loss and its gradient are computed. The actor networks are trained to minimize the actor loss. The loss function for actor networks is defined as below $$\mathcal{L}(\theta_k) = \frac{1}{|B|} \sum_{s \in B} RAA\left( \left\{ \frac{1}{M} \sum_{m=1}^{M} q_j(\phi_m; s, \mu(\theta_k; s)) \right\}_{j=1}^{N_{qt}} \right)$$

The actor networks, $\mu(\theta_k)$, are updated so as to increase the RAA of critics.

At S618, parameters of trained actor networks are updated using the gradient of the loss function through $$\theta_k \leftarrow \theta_k + \delta \cdot \nabla_{\theta_k} \mathcal{L}(\theta_k)$$

where $\delta$ is the learning rate.

At S620, parameters of the target distributional critic networks and the target actor networks are updated with the updated trained parameters. The parameters of target (both actor and distributional critic) networks are slowly copied from those of trained networks. This protocol is called Polyak update and is represented by $$\widehat{\phi_m} \leftarrow p\widehat{\phi_m} + (1-p)\phi_m \quad \widehat{\theta_k} \leftarrow p\widehat{\theta_k} + (1-p)\theta_k$$

where $\phi_m$ (m=1, ..., M) denotes the parameters of m-th trained critic network and $\theta_k$ (k=1, ..., K) denotes the parameters of k-th trained actor network. The hat represents target networks. The parameter 0<p<1 must be tuned for each environment individually. After the training phase, target networks will no longer be used.

At S622, a determination is made as to whether enough update has been satisfied. If the answer is no, then the process returns to S610 to randomly sample another mini batch of (s,a,r,s') from the experience tuples. If the answer is yes, then the process proceeds to S624. At S624, the process determines whether there has been sufficient training of the system. If the answer is no, then the process begins again at S602 to initiate another around of training. If the answer is yes, then the process comes to an end.

Figure 7:
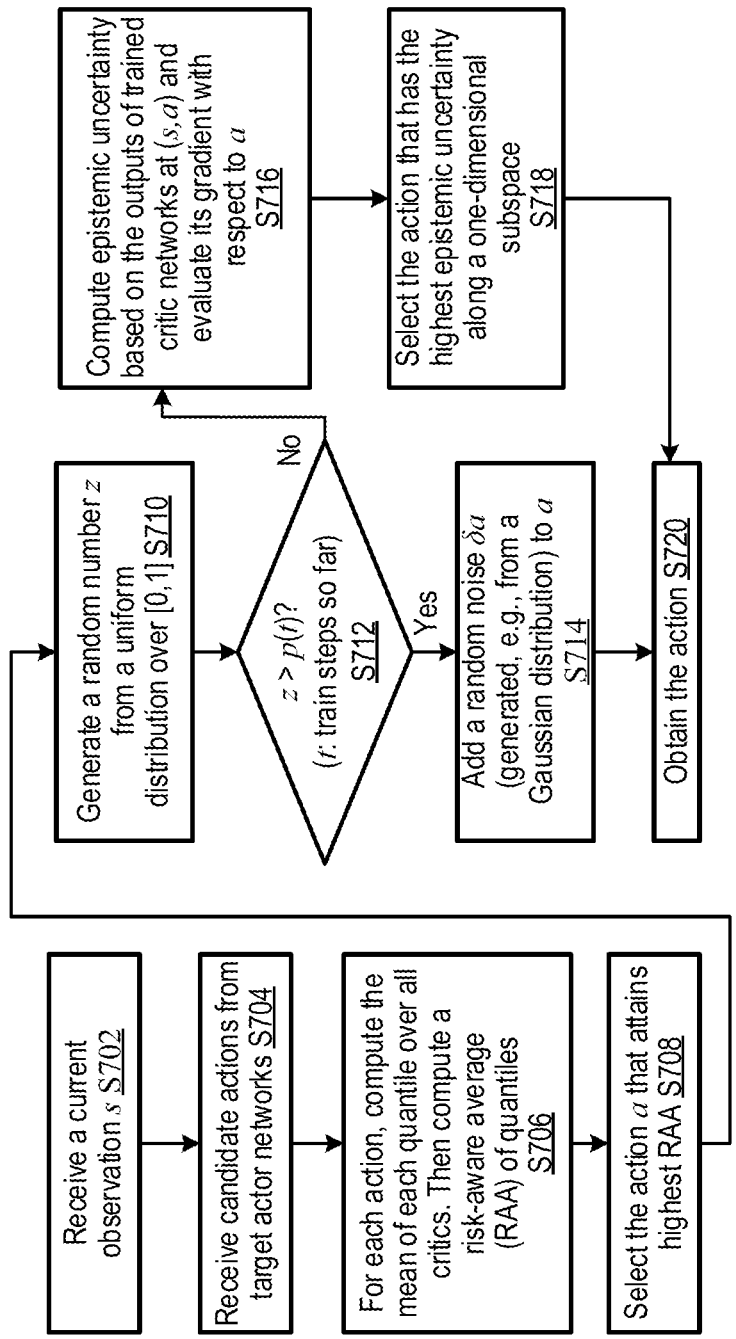
FIG. 7 illustrates an example process of action selection during the training phase of UA-DDPG, in accordance with an example implementation.

FIG. 7 illustrates an example process of action selection during the training phase of UA-DDPG, in accordance with an example implementation. The process begins with S702 where a current observation s is received. At S704, recommended actions are received from the target actor networks. For each action, the mean of each quantile over all distributional critics and RAA are calculated at S706. At S708, an action a that has attained a highest value of RAA is selected.

At S710, a random number z from a uniform distribution over [0,1] is generated. At S712, it is determined whether z>p(t), where t represents training steps thus far. If the answer is no, then the process proceeds to S716. If the answer is yes, then the process proceeds to S714, where a random noise $\delta a$ (e.g., from a Gaussian distribution) to is generated and added to a. The process then continues to S720, where the action is obtained.

At S716, epistemic uncertainty is calculated based on the outputs of trained distributional critic networks at (s,a) and evaluates its gradient with respect to a. Steps S710-718 represent stochastic switching between the two policies. Essentially, it is desired to have an RL agent to take high-EU actions greedily at early stages of the training phase to accelerate exploration, while take actions with low-EU and high-RAA more greedily at late stages of the training phase to promote convergence to the optimal policy. The randomization avoids sudden policy change, which is unlikely to lead to a smooth convergence of action and critic networks, and should therefore be avoided.

When the state space and action space are discrete and finite, the RL agent can visit all states and try all actions. This is perfect exploration of the environment. Thereby the agent can acquire the optimal policy that corresponds to the highest expected future cumulative rewards. However, when the state space and/or action space are continuous, perfect exploration is generally impossible due to the amount of time it takes to train. This is true especially when the reward is sparse. The agent has to take a long sequence of good actions without assistance of rewards. This is exceptionally difficult when the agent has no idea which state/action is good and which is bad, where it will just randomly explore the environment with no foresight or planning. The aim of evaluating EU is thus making exploration more efficient. A pair of state and action with high EU is novel to the agent, i.e., dissimilar to states/actions in past experiences. The exploration can be made more efficient by forcing the agent to seek high EU states and actions (viz. high novelty). Note that EU is a subjective quantity and will diminish over time during training. In a sense, EU plays the role of a 'memory' for the agent.

All states and actions are stored in the experience tuples and are sampled repeatedly to train the UA-DDPG system. Distributional critic networks converge to the same values for already visited observation/state and action pairs in the experience tuples, while disagreeing on novel observation/state and action pairs. Thus, pursuing an action that has high disagreement among critics (i.e., high epistemic uncertainty) is paramount from the viewpoint of faster and more efficient training.

The agent takes such an exploratory action with probability p(t) that depends on the elapsed training timesteps. With probability 1−p(t), the agent takes a greedy action with the addition of a random noise. The probability of exploration p(t) is high at early stages of the training and becomes low at later stages because exploration is more important at the beginning of training where knowledge on environment is limited.

The greedy action a in a state s is determined by the following formula.

$$a = \mu(\theta_{\bar{k}}; s),$$

$$\bar{k} = \underset{k}{\mathrm{argmax}}\left\{RAA\left(\left\{\frac{1}{M}\sum_{m=1}^{M}q_j(\phi_m; s, \mu(\theta_k; s))\right\}_{j=1}^{N_{qt}}\right)\middle| k = 1, 2, \ldots, K\right\}$$

$\Omega$: the action space $j$th quantile of the $m$th critic

The EU in state s is defined as a function of a general action a as shown below:

$$EU(\tilde{a}) = \frac{1}{N_{qt}}\sum_{i=1}^{N_{qt}}STD\{q_i(\phi_m; s, \tilde{a}) \mid m = 1, 2, \ldots, M\}$$

where STD represents the standard deviation of the set. Its gradient vector at the greedy action a is denoted as G; namely $G = \nabla_{\bar{\alpha}}EU(\tilde{\alpha})|_{\bar{\alpha}=\alpha}$.

Figure 8:
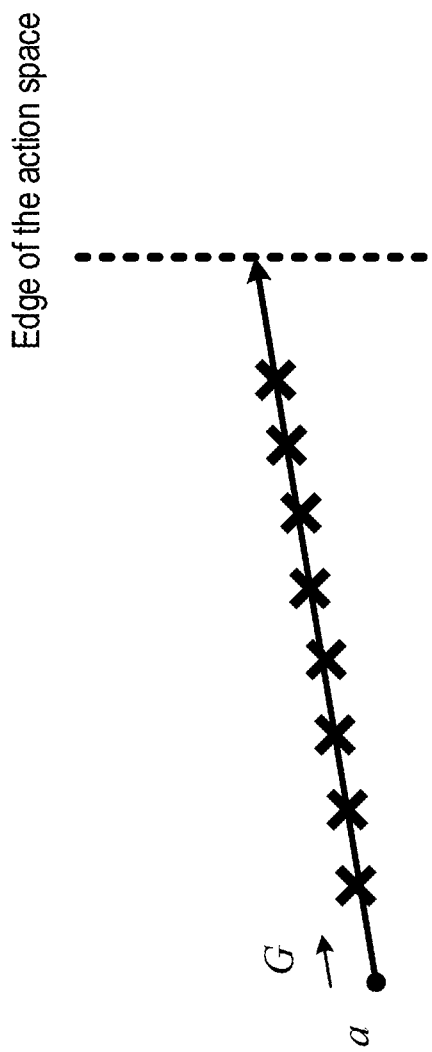
FIG. 8 illustrates an example one-dimensional linear gradient vector approximation for finding desired action, in accordance with an example implementation.

At S718, the action having the highest epistemic uncertainty along a one-dimensional subspace is selected. Specifically, a discrete one-dimensional search is performed over a linear subspace to find the action that has the highest epistemic uncertainty along this line, namely $$a' = \underset{\tilde{a}}{\mathrm{argmax}}\{EU(\tilde{a}) \mid \tilde{a} \in \{a + cG \mid 0 \le c < \infty\} \cap \text{action space}\}$$

which is the desired exploratory action in state s. FIG. 8 illustrates an example one-dimensional linear gradient vector approximation for finding desired action, in accordance with an example implementation. As illustrated in FIG. 8, it is useful to approximate the above linear space by a finite equally spaced set of points. An action with the highest gradient vector is selected as the desired action. The size of a set can be arbitrary and ranges between 20-100. In some example implementations, the size of the set can be predetermined. At S720, the action is obtained.

Figure 9:
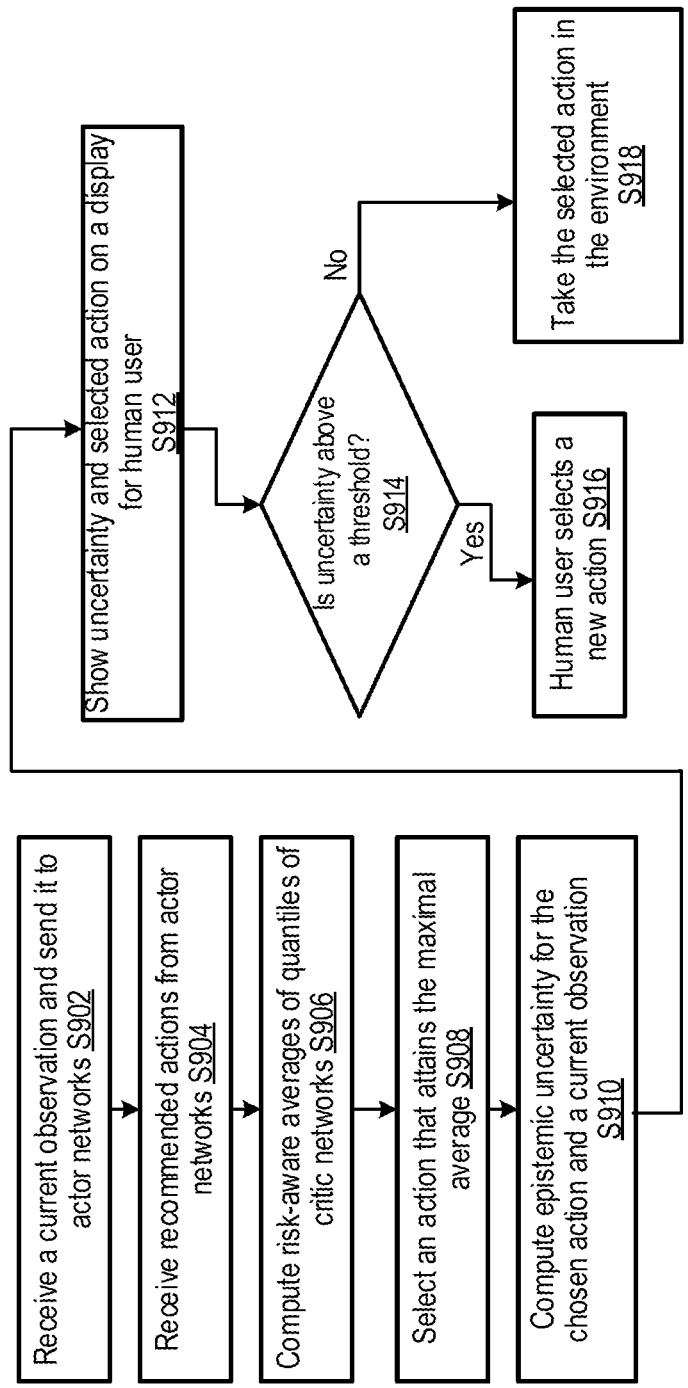
FIG. 9 illustrates an example processing flow of the UA-DDPG system, in accordance with an example implementation.

FIG. 9 illustrates an example processing flow of the UA-DDPG system, in accordance with an example implementation. At S902, a current observation/state is received and sent to the actor networks. At S904, recommended actions are received from the actor networks. At S906, risk-aware averages (RAA) of quantiles of distributional critic networks are computed. At S908, an action is selected that attains a maximal RAA from among the recommended actions. At S910, epistemic uncertainty is computed for the selected action and the current observation.

At S912, the uncertainty and the selected action are displayed for the user. At S914, a determination is made as to whether the epistemic uncertainty exceeds a threshold. If the answer is yes, then the process proceeds to S916, where the user selects a new action. If the answer is no, then the process proceeds to S918, where the selected action is chosen and applied in the environment.

Figure 10:
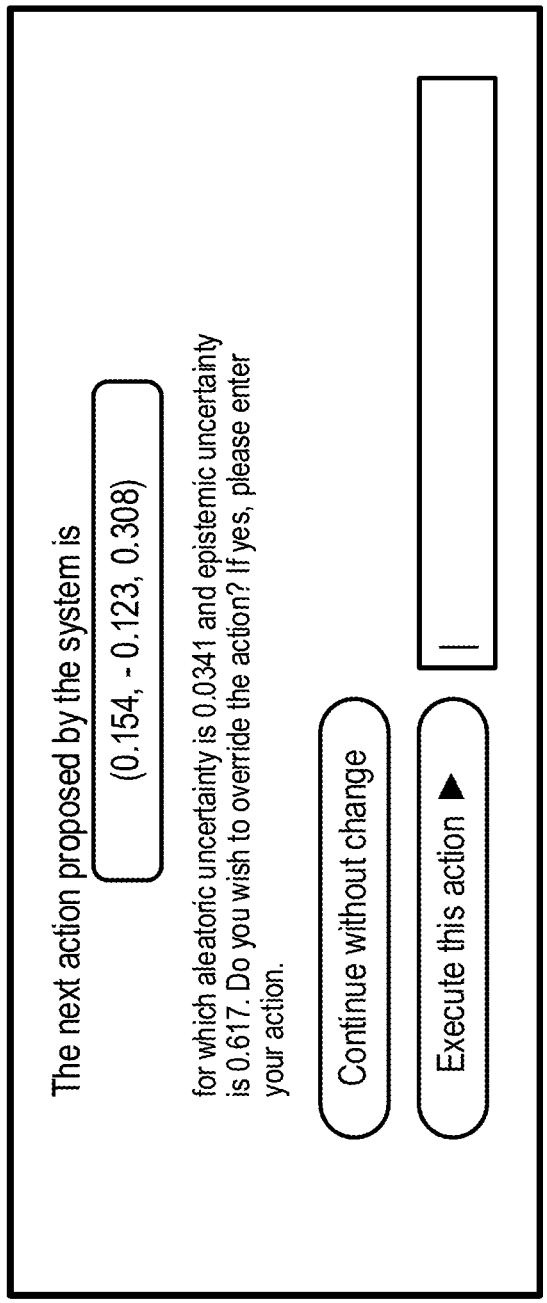
FIG. 10 illustrates an example user interface, in accordance with an example implementation.

FIG. 10 illustrates an example user interface (UI) 520, in accordance with an example implementation. The UI 520 generates a proposed next action and associated AU and EU values. The AU and EU are calculated from $$\text{Epistemic Uncertainty} = \frac{1}{N_{qt}} \sum_{i=1}^{N_{qt}} STD\{q_i(\phi_m; s, a) \mid m = 1, 2, \ldots, M\}$$

$$\text{Aleatoric Uncertainty} = \frac{1}{M} \sum_{m=1}^{M} STD\{q_i(\phi_m; s, a) \mid i = 1, 2, \ldots, N_{qt}\}$$

In addition to proposed action generation, the UI 520 also prompts options for user to select following the generated proposed action. Specifically, user of the system may select to continue without applying the proposed next action or to execute the proposed next action.

FIG. 11 illustrates example experience tuples 504, in accordance with an example implementation. As illustrated in FIG. 11, the experience tuples 504 stores information involving tuple number (No.), observation, action, reward, and next observation. As shown, observations have three dimensions and actions have two dimensions. Oldest tuples are deleted as more tuples are saved in the experience tuples 504.

The foregoing example implementation may have various benefits and advantages. For example, continuous control tasks are solved by training actor networks that yield a continuous action as a function of the current observation. EU can be quantified by training multiple critic networks with independent random initializations in parallel. Training of the RL agent may be accelerated by taking actions that correspond to high EU, because high EU implies that such states or actions have rarely been encountered during past training experiences and could be informative for the agent. At the same time, AU can be quantified by letting each critic network learn quantiles of the probability distribution of return. Safe/low-risk decision making can be enforced by encouraging the RL process to avoid actions that run the risk of producing dangerous/undesirable outcomes, on the basis of estimated return distributions. In addition, trustworthiness of an RL-based control system can be enhanced by displaying uncertainty of AI's decision on a monitor and enabling a human operator to intervene or override AI's action when uncertainty is high.

Figure 12:
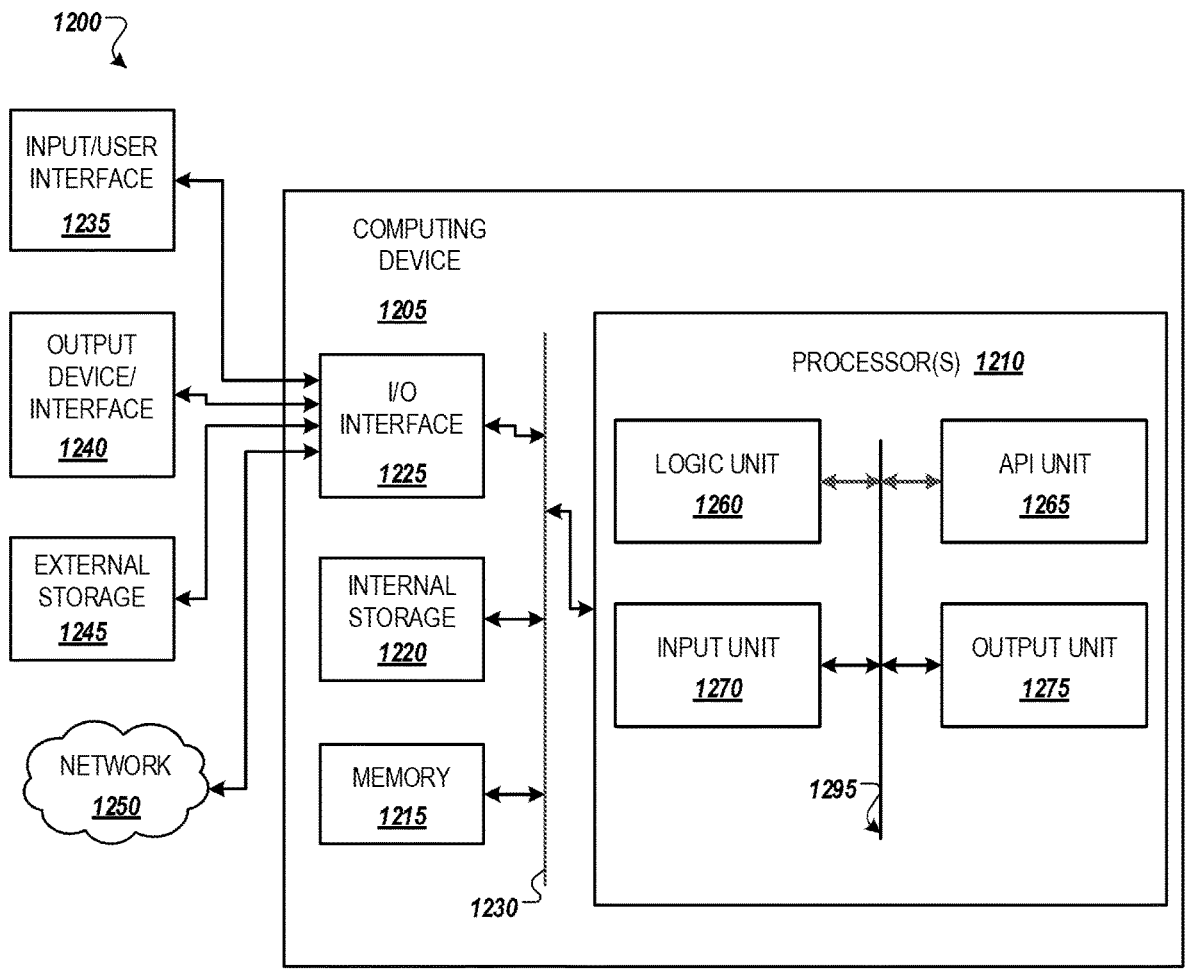
FIG. 12 illustrates an example computing environment with an example computer device suitable for use in some example implementations.

FIG. 12 illustrates an example computing environment with an example computer device suitable for use in some example implementations. Computer device 1205 in computing environment 1200 can include one or more processing units, cores, or processor(s) 1210, memory 1215 (e.g., RAM, ROM, and/or the like), internal storage 1220 (e.g., magnetic, optical, solid-state storage, and/or organic), and/or IO interface 1225, any of which can be coupled on a communication mechanism or bus 1230 for communicating information or embedded in the computer device 1205. IO interface 1225 is also configured to receive images from cameras or provide images to projectors or displays, depending on the desired implementation.

Computer device 1205 can be communicatively coupled to input/user interface 1235 and output device/interface 1240. Either one or both of the input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via IO interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

TO interface 1225 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, the input unit 1270, the output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide an output based on the calculations described in example implementations.

Processor(s) 1210 can be configured to receive a state as input to at least one actor network to predict candidate actions based on the state, wherein the state is a current observation as shown in FIG. 2. The processor(s) 1210 may also be configured to output the candidate actions from the at least one actor network as shown in FIG. 2. The processor(s) 1210 may also be configured to receive the state and the candidate actions as inputs to a plurality of distributional critic networks, wherein the plurality of distributional critic networks calculates quantiles of a return distribution associated with the candidate actions in relation to the state as shown in FIG. 2. The processor(s) 1210 may also be configured to output the quantiles from the plurality of distributional critic networks as shown in FIGS. 3 and 5. The processor(s) 1210 may also be configured to selecting an output action based on the candidate actions and the quantiles as shown in FIG. 9.

The processor(s) 1210 may also be configured to train the plurality of distributional critic networks, during a training phase, using a loss function of critics, the loss function of critics is calculated utilizing the plurality of actor networks and a randomly selected data set from stored data batch, wherein the selected data set comprises an observed state, executed action based on the observed state, reward, and a next observed state as shown in FIG. 6.

The processor(s) 1210 may also be configured to train the plurality of actor networks, during the training phase, using a loss function of actors, the loss function of actors is calculated utilizing the plurality of actor networks and the selected data set as shown in FIG. 6. The processor(s) 1210 may also be configured to sample the selected data set to compute actor loss and actor loss gradient from the loss function of actors as shown in FIG. 6. The processor(s) 1210 may also be configured to update actor parameters using the actor loss gradient to minimize the loss function of actors as shown in FIG. 6.

The processor(s) 1210 may also be configured to select a trained output action, during the training phase, based on the trained plurality of actor networks and the trained plurality of distributional critic networks as shown in FIG. 7. The processor(s) 1210 may also be configured to calculate, for each of actions generated from the trained plurality of actor networks, a risk-aware average (RAA) of quantiles associated with the trained plurality of distributional critic networks, wherein the RAA measures a pessimistic average of possible outcomes as shown in FIG. 7. The processor(s) 1210 may also be configured to select an action with a highest one of the RAA as shown in FIG. 7. The processor(s) 1210 may also be configured to compare an exploratory probability associated with elapsed training timesteps against a probability threshold as shown in FIG. 7.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for reinforcement learning (RL) of continuous actions for controlling physical systems, comprising:
   receiving a state as input to at least one actor network to predict candidate actions based on the state, wherein the state is a current observation;
   outputting the candidate actions from the at least one actor network;
   receiving the state and the candidate actions as inputs to a plurality of distributional critic networks trained with independent random initializations of network parameters in parallel through interactions with an environment, wherein there is no direct interaction between different critic networks, wherein the plurality of distributional critic networks calculates quantiles of a return distribution associated with the candidate actions in relation to the state, wherein the plurality of distributional critic networks converge to same values for previously visited state-action pairs while disagreeing on novel state-action pairs;
   outputting the quantiles from the plurality of distributional critic networks; and
   selecting an output action based on the candidate actions and the quantiles, wherein the selecting comprises:
   executing high-epistemic uncertainty actions in early training stages to accelerate exploration of optimal control parameters for a physical system; and
   transitioning to low-uncertainty actions in later stages to promote convergence to optimal control policies to control the physical system.

2. The method of claim 1, further comprising training the plurality of distributional critic networks, during a training phase, using a loss function of critics, the loss function of critics is calculated utilizing a plurality of actor networks and a randomly selected data set from stored data batch, wherein the selected data set comprises an observed state, executed action based on the observed state, reward, and a next observed state.

3. The method of claim 2, wherein the training the plurality of distributional critic networks using the loss function of critics comprises:
   sampling the selected data set to compute critic loss and critic loss gradient from the loss function of critics; and
   updating critic parameters using the critic loss gradient to minimize the loss function of critics.

4. The method of claim 3, further comprises:
   training the plurality of actor networks, during the training phase, using a loss function of actors, the loss function of actors is calculated utilizing the plurality of actor networks and the selected data set,
   wherein the training the plurality of actor networks using a loss function of actors comprises:
      sampling the selected data set to compute actor loss and actor loss gradient from the loss function of actors; and
      updating actor parameters using the actor loss gradient to minimize the loss function of actors.

5. The method of claim 4, further comprises:
   selecting a trained output action, during the training phase, based on the trained plurality of actor networks and the trained plurality of distributional critic networks, the selecting the trained output action comprises:
      calculating, for each of actions generated from the trained plurality of actor networks, a risk-aware average (RAA) of quantiles associated with the trained plurality of distributional critic networks, wherein the RAA measures a pessimistic average of possible outcomes;
      selecting an action with a highest one of the RAA; and
      comparing an exploratory probability associated with elapsed training timesteps against a probability threshold,
         if the probability threshold exceeds the exploratory probability, adding a random noise to the selected action with the highest one of the RAA and outputting the selected action as the trained output action, and
         if the probability threshold does not exceed the exploratory probability:
            calculating epistemic uncertainty for each of the actions generated from the trained plurality of actor networks, and
            selecting an action with a highest one of the calculated epistemic uncertainties as the trained output action.

6. The method of claim 1, the selecting the output action based on the candidate actions and the quantiles further comprises:
   calculating, for each of the candidate actions, a risk-aware average (RAA) of quantiles associated with the plurality of distributional critic networks having critic parameters generated from a training phase, wherein the RAA measures a pessimistic average of possible outcomes; and
   selecting a candidate action with a highest one of the RAA.

7. The method of claim 6, the selecting the output action based on the candidate actions and the quantiles further comprises:

calculating an epistemic uncertainty for the selected candidate action; and comparing the epistemic uncertainty against a threshold, wherein
if the epistemic uncertainty is above the threshold, a different candidate action is selected as the output action; and
if the epistemic uncertainty is not above the threshold, the selected candidate action is selected as the output action.

8. A non-transitory computer readable medium, storing instructions for reinforcement learning (RL) of continuous actions for controlling physical systems, the instructions comprising:

receiving a state as input to at least one actor network to predict candidate actions based on the state, wherein the state is a current observation;

outputting the candidate actions from the at least one actor network;

receiving the state and the candidate actions as inputs to a plurality of distributional critic networks trained with independent random initializations of network parameters in parallel through interactions with an environment, wherein there is no direct interaction between different critic networks, and wherein the plurality of distributional critic networks calculates quantiles of a return distribution associated with the candidate actions in relation to the state, wherein the plurality of distributional critic networks converge to same values for previously visited state-action pairs while disagreeing on novel state-action pairs;

outputting the quantiles from the plurality of distributional critic networks; and selecting an output action based on the candidate actions and the quantiles, wherein the selecting comprises executing high-epistemic uncertainty actions in early training stages to accelerate exploration; and transitioning to low-uncertainty actions in later stages to promote convergence to optimal control policies to control the physical system.

9. The non-transitory computer readable medium of claim 8, further comprising:

training the plurality of distributional critic networks, during a training phase, using a loss function of critics, the loss function of critics is calculated utilizing a plurality of actor networks and a randomly selected data set from stored data batch, wherein the selected data set comprises an observed state, executed action based on the observed state, reward, and a next observed state.

10. The non-transitory computer readable medium of claim 9, wherein the training the plurality of distributional critic networks using the loss function of critics comprises:

sampling the selected data set to compute critic loss and critic loss gradient from the loss function of critics; and updating critic parameters using the critic loss gradient to minimize the loss function of critics.

11. The non-transitory computer readable medium of claim 10, further comprises:

training the plurality of actor networks, during the training phase, using a loss function of actors, the loss function of actors is calculated utilizing the plurality of actor networks and the selected data set, wherein the training the plurality of actor networks using a loss function of actors comprises:

sampling the selected data set to compute actor loss and actor loss gradient from the loss function of actors; and updating actor parameters using the actor loss gradient to minimize the loss function of actors.

12. The non-transitory computer readable medium of claim 11, further comprises:

selecting a trained output action, during the training phase, based on the trained plurality of actor networks and the trained plurality of distributional critic networks, the selecting the trained output action comprises:

calculating, for each of actions generated from the trained plurality of actor networks, a risk-aware average (RAA) of quantiles associated with the trained plurality of distributional critic networks, wherein the RAA measures a pessimistic average of possible outcomes;

selecting an action with a highest one of the RAA; and comparing an exploratory probability associated with elapsed training timesteps against a probability threshold,
if the probability threshold exceeds the exploratory probability, adding a random noise to the selected action with the highest one of the RAA and outputting the selected action as the trained output action, and
if the probability threshold does not exceed the exploratory probability:
calculating epistemic uncertainty for each of the actions generated from the trained plurality of actor networks, and
selecting an action with a highest one of the calculated epistemic uncertainties as the trained output action.

13. The non-transitory computer readable medium of claim 8, the selecting the output action based on the candidate actions and the quantiles further comprises:

calculating, for each of the candidate actions, a risk-aware average (RAA) of quantiles associated with the plurality of distributional critic networks having critic parameters generated from a training phase, wherein the RAA measures a pessimistic average of possible outcomes; and selecting a candidate action with a highest one of the RAA.

14. The non-transitory computer readable medium of claim 13, the selecting the output action based on the candidate actions and the quantiles further comprises:

calculating an epistemic uncertainty for the selected candidate action; and comparing the epistemic uncertainty against a threshold, wherein
if the epistemic uncertainty is above the threshold, a different candidate action is selected as the output action; and
if the epistemic uncertainty is not above the threshold, the selected candidate action is selected as the output action.

* * * * *